United States Patent
Matsumoto et al.

Patent Number: 5,419,889
Date of Patent: May 30, 1995

[54] METHOD FOR MANUFACTURING HIGH PURITY GRAPHITE MATERIAL

[75] Inventors: Tsuyoshi Matsumoto; Toru Hoshikawa, both of Kagawa, Japan

[73] Assignee: Toyo Tanso Co., Ltd., Osaka, Japan

[21] Appl. No.: 227,687

[22] Filed: Apr. 14, 1994

Related U.S. Application Data

[63] Continuation of Ser. No. 51,439, Apr. 22, 1993, abandoned, which is a continuation of Ser. No. 821,301, Jan. 13, 1992, abandoned, which is a continuation of Ser. No. 604,406, Oct. 29, 1990, abandoned, which is a continuation of Ser. No. 401,487, Aug. 30, 1989, abandoned, which is a continuation of Ser. No. 99,464, Sep. 21, 1987, abandoned.

[30] Foreign Application Priority Data

Sep. 21, 1986 [JP] Japan .................. 61-224131

[51] Int. Cl.$^6$ ............................................. C01B 31/02
[52] U.S. Cl. .................. 423/448; 423/449.1; 423/460; 423/461
[58] Field of Search ............... 423/448, 449, 460, 461

[56] References Cited

U.S. PATENT DOCUMENTS

| | | | |
|---|---|---|---|
| 1,884,600 | 10/1932 | Derby | 423/448 |
| 2,060,663 | 11/1936 | DeWalt | 423/461 |
| 3,089,754 | 5/1963 | Nedopil | 423/461 |
| 3,416,895 | 12/1968 | Leistner et al. | 423/448 |
| 3,725,110 | 4/1973 | Rodgers et al. | 423/448 |
| 3,998,933 | 12/1976 | Henderson et al. | 423/448 |
| 4,160,813 | 7/1979 | Markel et al. | 423/448 |
| 4,217,336 | 8/1980 | Maire et al. | 423/449 |

FOREIGN PATENT DOCUMENTS

| | | | |
|---|---|---|---|
| 637055 | 2/1962 | Canada | 423/448 |
| 945092 | 4/1974 | Canada | 423/461 |

*Primary Examiner*—Robert Kunemund
*Attorney, Agent, or Firm*—Armstrong, Westerman, Hattori, McLeland & Naughton

[57] ABSTRACT

A method for manufacturing a high purity graphite material comprises a baking process of a carbon material, a graphitizing process of the material and a highly purifying process of the material in sequential order, the highly purifying process of the material being carried out by high-frequency heating means under vacuum or reduced pressure. An apparatus for manufacturing a high purity graphite material comprises a container capable of being made vacuous or depressurized and in which an induction heating high-frequency coil and a graphite heater are incorporated, the container being provided with a gas discharge pipe and a gas supply pipe.

2 Claims, 1 Drawing Sheet

METHOD FOR MANUFACTURING HIGH PURITY GRAPHITE MATERIAL

This application is a continuation of application Ser. No. 08/051,439 filed Apr. 22, 1993, now abandoned, which is a continuation of Ser. No. 07/821,301 filed Jan. 13, 1992, abandoned, which is a continuation of Ser. No. 07/604,406, filed Oct. 29, 1990, abandoned, which is a continuation of Ser. No. 07/401,487, filed Aug. 30, 1989, abandoned, which is a continuation of Ser. No. 07/099,464, filed Sep. 21, 1987, abandoned.

BACKGROUND OF THE INVENTION

The present invention relates to a method for manufacturing a high purity graphite material and an apparatus for manufacturing the high purity graphite material by using the method.

Hithereto, graphitization of a carbon product has been carried out in the following manner. That is, a generally known method comprises:

a process A in which a carbon product is first heated up to 800° to 1000° C. in a baking furnace, then is baked while dispersing and evaporating volatile components included in a binder and others;

a process B in which the baked material is taken out and put in a graphitizing furnace such as Acheson furnace, Castner furnace or induction heating furnace to be heated up to 3000° C., thereby achieving graphitization of the material; and a process C in which the material thus graphitized is further heated in a reactor under a gaseous atmosphere which includes halogen, so that impurities included in the graphitized material is transformed to a volatile material and volatilized out of the base material, thereby achieving the high purification.

In the aforementioned conventional method for graphitization and high purification, it is necessary for the carbon material to be delivered from one furnace to the other for each process of baking, graphitization and high purification, which takes much time and labor and moreover there is a possibility of breaking down the material.

It is further required to raise and decrease the temperature for each of the furnaces, which is not economical in view of utilization of heat energy and rate of operation of the apparatus.

Concerning the high purification process, as is disclosed in Japanese Laid-Open Patent Publication (unexamined) No. 58-84181 for example, a method was proposed in which the high purification process is further divided into three steps, i.e., a first step wherein impurities are chlorinated by putting it contact with HCl gas under normal pressure, a second step wherein the temperature of the carbon material is raised under reduced pressure so that metallic chloride in the internal part of the carbon material is easy to desorb, and a third step wherein residual impurities are eliminated by using $H_2$ gas under nornal pressure after being transformed to a hydride. According to this method, the carbon material to be highly purified is placed in a silica tube and heated from outside the tube.

Another method for manufacturing a high purity graphite was disclosed in Japanese Patent Publication (examined) No. 35-5737, in which the Acheson furnace is adopted and not only chlorine but also fluorinated hydro-carbon can be used under normal pressure.

However, in any of the conventional high purification methods, purification indeed can be attained to a certain extent, but purity of the graphite obtained in this manner is not satisfactory in view of the recent tendency of increasingly demanding a higher purity graphite. Further, in the case of the aforementioned high purification process disclosed in the Publication 58-84181, three steps are separately required, which is not satisfactory in view of pratical use on the commercial basis.

Concerning the type of furnace, Acheson furnace, Castner furnace and induction heating system are conventionally known. In the former two furnaces which are installed horizontally, a problem exists in that a relatively large area is needed and that power efficiency thereof is inferior to the latter since the surface area of the former is larger than the latter.

Recently, there was proposed a relatively advanced method in which after carrying out the baking process A in a separate furnace, the graphitization process B and the high purification process C are then carried out continuously in an Acheson furnace under normal pressure. However, there still exist the following disadvantages in this method. That is, in such method a large area is needed as discussed before, power consumption is also large, and contact between halogen gas and carbon material is not satisfactory due to structural restriction of the furnace. Moreover, since the high purification takes place under the normal pressure, halogenated impurities are not sufficiently desorbed, thereby requiring a rather long operation time resulting in large amount of halogen consumption.

There was proposed a yet further system in which a vacuum type furnace incorporating a heating element of resistor type such as electrode is used. This system is not satisfactory, either, because unevenness in heating is prone to occur and besides heat insulation of components located in the vicinity of a graphite heater (hereinafter referred to as "susceptor") is rather low, which means that this method is not suitable for manufacturing a very high purity graphite material, either. Particularly when it is attempted to shorten and perfectly carry out the halogenating process by repeating fluctuation in the furnace pressure like pulsation as described later, it is almost impossible to carry out operation control. Even if possible, the operation will be considerably complicated. As the result, leakage of halogen out of the susceptor will occur bringing about a further problem of corrosion of metallic materials in the container, connection part of the heater, etc.

SUMMARY OF THE INVENTION

An object of the present invention is, therefore, to provide a novel method for economically manufacturing a high purity graphite material and a novel apparatus for use thereof, both being not achievable under the state of art.

Another object of the invention is to provide a novel high purification process and an apparatus thereof in which graphitization and high purification are carried out in one furnace so as to attain cost reduction in conveying carbon material, prevention of energy loss due to breakdown of carbon material and cooling and heating cycle of the apparatus, improvement in rate of operation of the apparatus, and reduction in halogen consumption peculiar to high purification.

A further object of the invention is to provide an greatly improved graphitization and high purification process and an apparatus thereof to obtain a carbon product of supremely high purity which has not been achieved by the prior method and apparatus.

The foregoing objects are accomplished by providing a method for manufacturing a high purity graphite material comprising a baking process of a carbon material, a graphitizing process of the material and a highly purifying process of the material in sequential order, the method being characterized in that said highly purifying process of the material is carried out by high-frequency heating means under vacuum or reduced pressure. The foregoing method are carried out by an apparatus comprising a container capable of being made vacuous or depressurized in which an induction heating high-frequency coil and a graphite heater are incorporated, said container being provided with a gas discharge pipe and a gas supply pipe.

Other objects and features of the present invention will become apparent in the course of the following description.

DESCRIPTION OF THE PREFERRED EMBODIMENT

Figure 1:
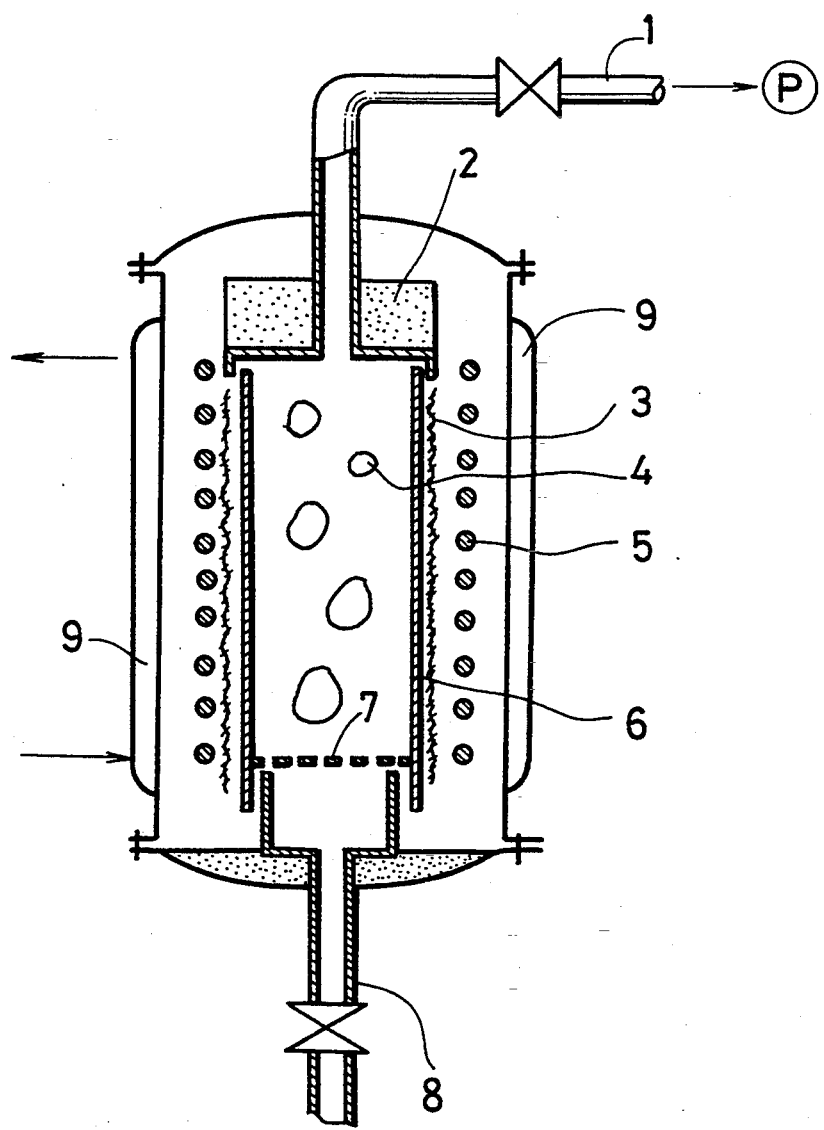
FIG. 1 is a schematic side sectional view of a vacuum and high-frequency heating type apparatus for manufacturing a high purity carbon material according to the present invention.

An embodiment of the present invention is now decribed in detail hereunder, and in which for the sake of convenience, first an apparatus of the invention is described referring to the accompanying drawing, then followed by the description of a method thereof.

In FIG. 1 illustrating a schematic side sectional view of the apparatus, a reference numeral (1) denotes a gas discharge pipe, numerals (2) and (3) denote heat insulating materials, (4) denotes a carbon material to be heated, (5) is a high-frequency coil, (6) is a susceptor, (7) is a tray, (8) is a gas supply pipe and (9) is a jacket.

A first feature of the invention consists in that, for the purpose of heating raw carbon material, a high-frequency heating furnace of high energy efficiency which occupies a smaller floor area is adopted.

A second feature of the invention consists in that, a graphite heater, i.e., a susceptor (6) is disposed between the high-frequency coil (5) and the carbon material (4) to be heated.

A third feature of the invention consists in that the high-frequency coil (5), susceptor (6) and the carbon material (4) to be heated are incorporated in a hermetically sealed container fit for depressurization or vacuum.

Incorporation of the carbon material (4) to be heated, high-frequency coil (5) and susceptor (6) in such vacuum container is one of the most important features of the invention as well as disposition of the gas discharge pipe (1), because the carbon material (4) to be heated can be efficiently and consistently graphitized and highly purified by such arrangement.

A fourth feature of the invention consists in that the gas supply pipe (8) and the gas discharge pipe (1) are disposed in the vacuum container.

The gas discharge pipe (1) is indispensable for discharging the gas produced at the time of pressure reduction or vacuum in the container and in the process of graphitization and high purification. In particular, this pipe (1) plays an important role when a metallic halide, metallic hydride, etc. evaporated from the graphite material are taken out of the reaction system in the high purification process.

The gas supply pipe (8) is used for supplying gas which includes halogen and/or $H_2$ gas to be used in the high purification process.

These gas supply and discharge pipes can be disposed at any suitable place in the vacuum container, and it is also possible to dispose a plurality of such pipes when necessary. It is preferable that the pipes are respectively disposed symmetrically either on upper and lower sides or on left and right sides in view of attaining more efficient contact between the gas flow and the carbon material in the container.

In the example illustrated in FIG. 1, the gas discharge pipe (1) and the gas supply pipe (8) are disposed vertically on upper and lower sides respectively, but these pipes can be also disposed horizontally on left and right sides, when installing a horizontal type high-frequency furnace.

In addition to the above described features, it is further possible to add following features.

That is, it is preferable to interpose heat insulating members (2), (3) between the high-frequency coil and the susceptor, which is a fifth feature of the invention. Such known materials as ceramic fiber, carbon fiber, carbon black or the like can be used as the heat insulating material so far as they perform excellent heat insulating effect.

It is also preferable to provide a water cooling jacket (9) on the outside of the vacuum container when necessary, which is a sixth feature of the invention.

A high frequency voltage of 250–3000 Hz is applied to the high-frequency coil, and the coil disposed going through a wall of the container is supplied with electric power.

Described hereinafter is a method for manufacturing a high purity graphite of the invention by using the apparatus of above composition.

In the manufacturing method of the invention, since the high purification process is basically carried out by using high-frequency heating means under vacuum or reduced pressure, one of the preferable modes thereof is to use an apparatus illustrated in FIG. 1.

It is to be noted that the graphitization process and the high purification process of the invention can be both carried out in one furnace, and therefore the invention includes not only a method in which the two processes take place sequentially in order but also a method in which the two processes are partially carried out in parallel.

To be specific, first $N_2$ gas is sent from the gas supply pipe (8) into the container to substitute the air in the container with the $N_2$ gas, then the container is put into a vacuum or reduced pressure state by discharging the $N_2$ gas from the gas discharge pipe (1) to make the atmosphere antioxidant.

Then the susceptor (6) is heated by gradually applying a voltage to the induction coil (5) so that the carbon material (4) is kept at 800°–1000° C. usually for 1–10 hours and more preferably for 3–5 hours by the radiation heat of the susceptor. Thereafter the temperature is raised to 2450°–2500° C. by gradual heating so that the material is graphitized after being kept within such temperature range for 5–24 hours and more preferably for 7–15 hours.

The internal part of the container is to be kept within 1–100 Torr and more preferably within 10–40 Torr once starting the heating, which is convenient for discharging gas impurities volatilized out of the base material.

At a stage after the graphitization has proceeded to a certain extent, a halogen gas such as dichlorodifluoromethane is fed from the gas supply pipe (8) while keeping the reduced pressure state. Quantity of flow of the halogen gas is decided in accordance with a volume of the carbon material to be heated which is charged into the container, and in normal operation the halogen gas is fed in the amount of 1–7 l NTP/kg for 3–8 hours.

The halogen gas used in the high purification process is applied particularly for the purpose of transforming metallic impurities into halogenated material. Any of the known halogens used conventionally is useful as the halogen gas. That is, not only chlorine and chloride but also fluorine and fluoride can be used. It is also preferable to use chlorine and fluorine together. It is further preferable to use a compound, in which fluorine and chlorine are included together in one molecule, such as monochlorotrifluoromethane, dichlorodifluoroethane, trichloromonofluoroethane or the like.

It is still further preferable to feed $H_2$ gas subsequent to stopping the supply of halogen-type gas with regard to a low sulfur product since $H_2$ brings a high purification effect. In addition, since the $H_2$ gas is effective not only on sulfur but also on metallic impurities, it is satisfactory to use $H_2$ gas alone. The foregoing chemicals used in the high purification process should be applied in an amount enough to eliminate the impurities in the carbon material.

After completing the operation for the high purification, the temperature in the furnace is further raised and kept at 3000° C. for 10–30 hours, thus the process being completed.

The purification can be further improved by largely reducing the container pressure to $10^{-2}$–$10^{-4}$ Torr at the temperature of 1800°–2200° C. and more preferably at 2000° C. on the step of cooling the furnace.

Thereafter, power supply is stopped, and the container is impregnated with $N_2$ gas for substitution and returned to normal pressure and temperature.

In the process of eliminating impurities, i.e., high purification process, the vacuum type high-frequency heating furnace according to the invention exhibits several advantages.

In the first place, consumption of the carbon material to be heated can be considerably reduced by putting the carbon material in contact with halogen or $H_2$ under vacuum or reduced pressure state. That is, since halogen gas is expanded under vacuum or reduced pressure, the rate of utilization thereof is high and desirable contact with carbon material can be achieved, resulting in small consumption of halogen. For example, as a result of test carried out by the inventor, consumption of dichlorodifluoromethane was 3 l NTP/kg in the method according to the invention, while it is 10 l NTP/kg in the case of a conventional furnace by electrical heating, which means that the consumption is reduced to ⅓ of the conventional method.

In the second place, since the container is in a reduced pressure state, impurities in the carbon material which were transformed into a halide and/or hydride are easy to be volatilized and desorb out of the carbon material which is a base material. As a result, a graphite of very high purity is obtained in spite of using a small amount of halogen gas or $H_2$ gas.

In this connection, there exist the following differences between the aforementioned known process disclosed in Japanese Laid-Open Patent Publication 58-84181 and that of the present invention. That is, in the known process, as is explicitly described in the specification thereof, chlorination by using HCl is carried out under normal pressure (1st process), then the halogenated impurities are put under vacuum state (2nd process) to be eliminated, and the other impurities are eliminated by application of $H_2$ (3rd process, the pressure used is not made clear). In other words, this known process is featured by that chlorination takes place under normal pressure, that the chlorination and the impurity desorption are separately carried out, and that any high-frequency heating furnace is not used.

On the other hand, in the impurity elimination process of the invention, halogenating reaction and desorption of halogenated impurities are both carried out simultaneously under reduced pressure or vacuum condition by applying halogen and/or $H_2$. Moreover, the known process does not disclose such simultaneous graphitization and high purification at all.

It is desired that the container pressure at the time of carrying out the high purification and/or graphitization is kept within a range between 100 Torr and 1 Torr. A pressure gauge indicates the container pressure in a form of a sum (i.e., total pressure) of steam pressures (i.e., partial pressures) of various compounds such as halogenated products, chlorinated and/or fluorinated impurities, residual $N_2$ gas at the time of substitution, etc. When the container pressure is higher than 100 Torr, the effect of reducing pressure is low taking long in the high purification process, and there is no particular qualitative advantage as compared with the conventional method performed under normal pressure. On the other hand, when the container pressure is less than 1 Torr, absolute quantity of halogen supply is insufficient, and there is disadvantages that the high purification of the internal part of the carbon material is not complete and that large pumping power is needed for discharging the gas produced.

As a result of studies and experiments for obtaining optimum values, the inventor found that the most preferable product was obtained under the pressure range of 100–1 Torr, more preferably 50–5 Torr.

Referring to a modification of the above described method of the invention, it is also preferable that the reactor is alternately pressurized and depressurized like pulsation in the process of high purification. When adopting such modification, diffusion and substitution of halogen gas into the internal part of the carbon material as well as desorption and substitution of the halogenated products from the internal part can be more effectively carried out. Such pulse pressurization and depressurization of the container are carried out by fluctuating pressure for about 10 hours at intervals of 15–30 minutes. The range of fluctuation can be appropriately selected.

As has been described so far, according to the apparatus and the method for manufacturing a high purity graphite by using vacuum and high-frequecy heating system of the invention, the following peculiar advantages are attained:

(a) since the high purification reaction takes place in a vacuum container, consumption of halogen gas is reduced, time required for the high purification process is largely shortened, and a graphite of high purity is obtained as compared with the conventional process. In this respect, the following Table 1 shows the amount of impurities in a high purity graphite which is manufactured by the apparatus and method of the invention, in comparison with the amount of impurities in a high purity graphite which is manufactured by the conventional method and available on the market as well as that in an ordinary graphite to which any high purification process is not applied; and (b) since a series of processes from the graphitization to the high purification can be carried out sequentially in order or a part thereof simultaneously in one furnace, there is no need of taking out a semi-manufactured product and place it again in the other furnace, but the manufacturing can be effected just by raising or decreasing the temperature in a continuous manner. As a result, thermal efficiency and rate of operation of the apparatus are both considerably improved as compared with the known method and apparatus.

TABLE 1

| Sample | Denomination of Impurities | | | | | | | | | |
|---|---|---|---|---|---|---|---|---|---|---|
| | Al | As | B | Be | Ca | Cd | Co | Cr | Cu | Fe | Ga |
| A | — | — | — | — | — | — | — | — | — | — | — |
| B | 0.3 | — | — | — | — | — | — | — | — | 1.0 | — |
| C | 14 | — | 3 | — | 6 | — | — | — | 0.5 | 26 | — |

| | Ge | Hg | In | K | Li | Mg | Mn | Na | Ni | P | Pb |
|---|---|---|---|---|---|---|---|---|---|---|---|
| A | — | — | — | — | — | — | — | — | — | — | — |
| B | — | — | — | — | — | 0.1 | — | — | — | — | — |
| C | — | — | — | 1 | 0.2 | — | — | 4 | 1 | | |

| | Si | Sn | Ti | V | Zn |
|---|---|---|---|---|---|
| A | — | — | — | — | — |
| B | 0.1 | — | — | — | — |
| C | 2 | 1 | 33 | 4.3 | 0.1 |

In the above Table 1, Sample A is a product obtained by the invention, and in which Sample C was used as a raw carbon material and was processed by an apparatus illustrated in FIG. 1 under the container pressure of 20 Torr at 900° C. for 4 hours, then at 2450°–2500° C. for 10 hours, with high purification by 3 1 NTP/kg of dichlorodifluoromethane, and further at 3000° C. for 20 hours;

Sample B is a product obtained by the conventional method, and in which Sample C was highly purified under normal pressure; and Sample C is a product available on the market (produced by TOYO TANSO CO., LTD.) and which is an isotropic graphite before high purification with its apparent density 1.80.

Concerning the method of analysis, the emission spectrum analysis and atomic absorption analysis were adopted. Unit of values is ppm, and (—) mark means "not detected".

In addition, the conventional method applied to Sample B was carried out under the following conditions: 5 1 NTP/kg of C Cl$_2$ F$_2$ (dichlorodifluoromethane) was highly purified at 2000°–2200° C. for about 20 hours.

What is claimed is:

1. A method for producing high purity graphite from a carbon material which comprises:
    a) heating the carbon material at 1–100 Torr in an induction furnace for 1–10 hours at 800°–1000° C. and then for 5–24 hours at 2450°–2500° C. to provide a graphitized material;
    b) supplying a halogen-containing gas to the graphitized material at 1–100 Torr in the same furnace at a temperature of 2450°–2500° C. for about 10 hours, while fluctuating the pressure in the furnace, to produce a purified graphitized material; and
    c) heating the purified graphitized material in the same furnace at 1–100 Torr for 10–30 hours at 3000° C.

2. A method according to claim 1 wherein the pressure is fluctuated at intervals of 15–30 minutes.

* * * * *